United States Patent Office 3,062,899
Patented Nov. 6, 1962

3,062,899
HALOGENATION PROCESS
Karl J. Sax, Orinda, Calif., assignor to Shell Oil Company, New York, N.Y., a corporation of Delaware
No Drawing. Filed June 17, 1960, Ser. No. 36,720
6 Claims. (Cl. 260—650)

This invention relates to the bromination of benzene and, more particularly, to the preparation of meta-dibromobenzene by the bromination of benzene. Still more particularly, it relates to a novel process for the preparation of mixtures of dibromobenzenes rich in meta-dibromobenzene by the catalytic bromination of benzene under specified conditions.

m-Dibromobenzenes are useful as intermediates in the production of aromatic compounds not readily prepared by other methods. For example, the bromine substituents may be hydrolyzed to hydroxyl groups to afford m-bromophenol or resorcinol. The m-dibromobenzenes are also useful intermediates in the preparation of meta-linked phenyl ethers via the Ullmann ether synthesis.

m-Dibromobenzenes have been prohibitively expensive to prepare by bromination of benzene, since in the conventional bromination the principal dibromobenzene products are the para (70%) and the ortho (30%) with only traces of the meta present in the reaction mixture. Because the boiling points of the para-, ortho- and meta-dibromobenzenes are in the range 218–221° C., the isomers are extremely difficult to separate by fractional distillation. Although meta-dibromobenzene may readily be prepared from meta-bromonitrobenzene via meta-bromoaniline by the Sandmeyer reaction, the cost of this synthesis is prohibitive.

One method of preparing meta-dihalobenzenes has been to isomerize the para- and ortho-dihalobenzenes to their meta isomer. These isomerizations have been accomplished at high temperatures and, in most cases, at superatmospheric pressures and in the presence of isomerization catalysts. These processes are expensive and their yields have been, in general, relatively low.

It is an object of the present invention to provide an economical high-yield process for preparing meta-dibromobenzene. Another object is the provision of a process for brominating benzene at relatively low temperatures and at atmospheric pressure to yield meta-dibromobenzene in high yield. The process for providing mixtures of dibromobenzenes rich in the meta isomer is another object of the invention, as is the provision of such a process characterized by a novel method of employing the bromination catalyst. Preparation of a mixture of dibromobenzenes rich in the meta isomer by the bromination of monobromobenzene under certain novel conditions is another object of the invention. Other objects will be apparent from the following description of the invention.

These objects are accomplished in the invention by the process which comprises reacting together bromine and benzene, in the proportions of about two moles of bromine per mole of benzene, at a temperature from about 40° C. to about 100° C., while adding to the mixture a catalytic amount of aluminum trihalide catalyst, said halide having an atomic weight greater than 19.

In general, the bromination of benzene with two moles of bromine per mole of benzene at ambient temperature produces predominantly p-dibromobenzene. If the bromination is conducted in the presence of an aluminum trihalide catalyst at low temperature, e.g., below about 40° C., the para-dibromo isomer is still the principal product. When two moles of bromine are reacted with a mole of benzene at a higher temperature, particularly between 75° and about 120° C., in the presence of the same amount of aluminum trihalide, however, the principal product is the meta isomer.

The catalysts employed for the bromination process of the invention are aluminum trihalides having the general formula AlX₃, where each anion X is a halide atom, preferably having an atomic weight greater than 19. Such catalysts include aluminum tribromide, aluminum trichloride and aluminum triiodide, as well as mixed aluminum trihalides. The preferred catalyst is aluminum tribromide.

Only a catalytic amount of the aluminum trihalide catalyst is required for the bromination. For example, an amount of aluminum tribromide on the order of about 4% w. total, based on the benzene, has been found to give excellent yields of m-dibromobenzene, while total amounts on the order of about 2% to about 6% are also effective. Amounts of catalyst below this range afford lower yields in reasonable times. Greater amounts of catalyst may result in the production of the meta isomer yield.

The process of the invention is conducted at a temperature above about 40° C. but below the boiling temperature of the mixture. Best results are obtained when temperatures between about 75° C. and 120° C. and, preferably, between about 80° C. and 100° C., are employed, since at higher temperatures special precautions must be taken to return the bromine and benzene reactants to the system as they volatilize. At lower temperatures, particularly those below about 40° C., the yield of m-dibromobenzene is materially reduced and the p-isomer is the principal product.

The bromination is most conveniently conducted at atmospheric pressure. Superatmospheric pressures may be employed if desired, but use of pressures greater than atmospheric is not necessary and, in general, affords no material advantage and requires the use of special equipment, thus increasing the cost of the process.

An important feature of the invention is the continuous addition of the catalyst to the bromination mixture during the bromination process of the invention. It has been observed that if all of the catalyst is present in the benzene at the beginning of the bromination, the yield of meta isomer, while greater than that in the uncatalyzed reaction, is still somewhat lower than the yield of p-dibromobenzene. If, however, the catalyst is added to the reaction mixture continuously over the course of the bromination, the yield of meta isomer is greater than 50% of the total dibromobenzene product and is considerably greater than that obtained when the total amount of catalyst is present in the benzene at the beginning of the bromination.

The continuous addition of the aluminum trihalide catalyst to the reaction mixture may be accomplished by adding catalyst uninterruptedly to the mixture, or by adding small, preferably equal, amounts of catalyst at intervals. The former method is convenient for plant operation, where metering pumps may be employed for such continuous addition. For smaller operations, on the pilot plant scale, it is satisfactory to add fresh catalyst periodically to the reaction mixture during the course of bromination until, when two moles of bromine per mole of benzene have been added to the mixture, the total amount of catalyst has been added.

Most desirably, the catalyst is added at a rate such that the total amount of catalyst in the reaction mixture is substantially proportional to the total amount of bromine therein. For example, when one-quarter of the total bromine has been introduced into the reaction mixture, one-quarter of the total aluminum trihalide should also have been added. Alternatively, smaller amounts of catalyst may be added during addition of the first mole of bromine, and larger amounts during addition of the second mole. On the other hand, it is undesirable that larger than proportional amounts of catalyst be added during addition of the first mole of bromine, and smaller amounts during addition of the second mole. For example, no more than half of the total catalyst should be present in the reaction mixture when one mole of bromine has been added to obtain best results.

Thus, in one embodiment of the invention, mixtures of dibromobenzene rich in the meta isomer may be prepared in accordance with the process of the invention by reacting equimolar amounts of bromine and benzene in the absence of aluminum trihalide catalyst to afford monobromobenzene; and then adding the catalyst and an equimolar amount of bromine to the monobromobenzene to yield the desired mixture.

The bromination may be readily conducted in the liquid phase on a batch, semibatch or continuous basis by adding bromine and catalyst continuously to benzene at the reaction temperature until the total amounts of both have been introduced into the reaction mixture. The reaction may also be conducted as a two-step operation wherein substantially equimolar amounts of bromine and benzene are reacted together at a temperature between about 25° C. and about 100° C., but more conveniently between about 40° C. and 100° C., to yield monobromobenzene; and then reacting another mole of bromine with the monobromobenzene, in substantially equimolar amounts, at a temperature between about 75° C. and about 100° C., while adding the catalytic amount of aluminum trihalide catalyst to the reaction mixture. Thus, if desired, monobromobenzene produced in any convenient manner may be reacted under the conditions of the invention with one mole of bromine per mole of bromobenzene during continuous addition of aluminum trihalide to afford a mixture of dibromobenzenes in which the meta isomer predominates. Because it is faster and more convenient to prepare m-dibromobenzene by reacting all of the required bromine with benzene in one process, these reactants are preferred.

Best results are obtained when the bromination is conducted under substantially anhydrous conditions. While special predrying of the benzene or monobromobenzene, bromine and aluminum trihalide catalyst is not necessary, it is desirable to avoid the deliberate or inadvertent introduction of water into the reaction zone during the course of bromination.

When all of the bromine and catalyst have been added to the reaction mixture, the mixture is cooled, the catalyst inactivated, and the dibromobenzenes separated therefrom by conventional methods, such as fraction distillation. In order to prevent isomerizations and other side reactions from taking place in the reaction product, it is desirable to inactivate the catalyst by treatment or extraction of the reaction mixture with aqueous caustic before any treatment of the mixture is attempted. The mixture so treated may readily be fractionated to yield the dibromobenzene product mixture. It will be found that in the reaction mixtures produced in accordance with the process described more than half of the dibromobenzenes, and generally more than two-thirds, will be the meta isomer, with the remainder being predominantly the para-dibromobenzene.

By chilling the dibromobenzene fraction of the reaction mixture below room temperature, a mixture of dibromobenzenes especially rich in meta isomer is obtained. This enrichment is achieved by cooling the dibromobenzenes to about 15° C., and particularly to temperatures below 0° C., as low as about −15° C. By reducing the temperature of the dibromobenzene mixture to these low temperatures, para-dibromobenzene insoluble in the mixture crystallizes out and may readily be removed by filtration. The liquid mixture of the filtrate contains only small amounts, on the order of about 10%, of the para isomer. For example, by cooling a mixture of dibromobenzene isomers to a temperature of −12° C. and filtering or decanting off the crystallized solids, the p-dibromobenzene content of the liquid may be reduced from about 25% to less than one-half that value.

To illustrate the enhanced yields of m-dibromobenzene obtained by practicing the process of the invention, the results of some typical brominations are presented in Table I. In these experiments, the bromination of the benzene used was conducted stepwise in a stirred glass reaction vessel equipped with thermometer, addition funnel and reflux condenser. About half of the bromine was added over a one- to two-hour period at about 30–40° C. with the addition of a total of about one-quarter of the aluminum trihalide catalyst. The reaction mixture was then heated to about 80° C. and the remainder of the catalyst and bromine was added over a two-hour period.

TABLE I

| Starting Benzene Compound Catalyst | Benzene | | Bromobenzene | |
|---|---|---|---|---|
| | $AlBr_3$ | $AlCl_3$ | $AlBr_3$ | $AlCl_3$ |
| Percent Monobromobenzene in product (B.P. 154–217° C.) | 10 | 4.5 | 4.0 | 7.2 | 2.9 |
| Percent Dibromobenzene in product (B.P. 217–222° C.) | 72 | 55 | 64 | 75 | 80 |
| Percent Residues | 16 | 41 | 32 | 18 | 17 |
| Composition of dibromobenzene fraction: | | | | | |
| (o- | 4 | 4.6 | 3.5 | 4 | 2 |
| (m- | 63 | 63 | 54 | 64 | 61 |
| (p- | 33 | 32 | 43 | 32 | 37 |
| Percent dibromobenzenes liquid below −10° C. | 47.3 | | 32 | 46.3 | 35.4 |
| Composition of dibromobenzenes liquid below −10° C.: | | | | | |
| (o- | 5 | | 4 | 6 | 4 |
| (m- | 82 | | 85 | 84 | 85 |
| (p- | 12 | | 11 | 10 | 11 |

The following examples will serve to illustrate the nature of the process of the invention. It should be understood, however, that the examples are merely illustrative and are not to be regarded as limitations on the appended claims, since the basic teachings therein may be varied at will as will be understood by a skilled organic chemist. In the examples, the ingredients are expressed in parts by weight unless otherwise indicated.

The analyses reported in the examples were conducted by means of infrared spectroscopy unless otherwise specified. Percentages of the various isomers in mixtures were determined by infrared absorption spectra. The absorbences were calculated at 12.35 mμ for p-dibromobenzene; 13.0 mμ for m-dibromobenzene; and 13.4 mμ for o-dibromobenzene and were plotted against concentration for several different concentrations. Mixtures of known concentrations were also run and the absorbences of the individual isomers were also plotted. Lines were drawn through the resulting points, and from the resulting curves the concentration of a given isomer in a mixture of dibromobenzenes could be determined.

*Example I.—Bromination of Benzene With Aluminum Bromide Catalyst*

A mixture of 156.2 g. of benzene (2.0 moles) and 7 g. of aluminum bromide was treated during stirring over a two-hour period at 40° with 288 g. (1.8 moles) of bromine. The reaction mixture was heated to 95° and the same amount of bromine was added during stirring over a two-hour period. The reaction mixture was cooled to 25° overnight. Since crystals appeared, six grams of aluminum bromide was added and the mixture heated to 50° and allowed to cool slowly. The reaction mixture was washed with potassium hydroxide solution, then with water and was dried over magnesium sulfate and filtered. Distillation gave 41.5 g., B.P. 155–217° and the dibromobenzenes fraction, B.P. 217–222°, 306.5 g. (64.8%), which contained 62.7% meta-, 4.0% ortho- and 33.3% para-isomer. The dibromobenzenes fraction was cooled to −10° and filtered. Two hundred and one grams (42.6%) of liquid, 82% meta-, 5.4% ortho- and 12.3% para-isomer, was obtained.

*Example II.—Bromination of Benzene With Aluminum Chloride Catalyst*

A mixture of 560 g. (7.17 moles) of benzene and 10 g. of aluminum chloride was stirred and bromine (2,311 g., 14.44 moles) was added according to the following table:

| Time | Temp. | Bromine Added (g.) | Remarks |
|---|---|---|---|
| 0 | 30 | 0 | |
| 25 | 45 | 200 est. | |
| 55 | 45 | 423 | |
| 150 | 48 | 894 | Increased heat; 13 g. AlCl₃. |
| 245 | 84 | 900 est. | |
| 305 | 85 | 1,333 | |
| 365 | 95 | | |
| 385 | 87 | 1,820 | Added 14 g. AlCl₃. |
| 435 | 84 | 2,311 | Added 28 g. AlCl₃. |

The reaction mixture was rapidly heated to 112° and cooled overnight. It was cooled to 10° for two hours and extracted with potassium hydroxide solution, washed with water, dried over magnesium sulfate, filtered and distilled. Only 22 g. of bromobenzene and intermediate fraction was obtained. The remainder, 1089 g. (64.4) of dibromobenzenes, B.P. 217–221° and 300 g. of bottoms showed that the material was overbrominated due to loss of benzenes in the hydrogen bromide evolved. The dibromobenzenes fraction consisted of 54% meta-, 3.5% ortho- and 43% para-isomer. The dibromobenzenes fraction was chilled at −11° and filtered to give 541 g. of liquid isomer, 85% meta, 4% ortho and 11% para.

*Example III.—p-Dibromobenzene Isomerization With Aluminum Chloride*

Eight hundred grams of p-dibromobenzene was melted in a flask equipped with thermometer well, stirrer and a reflux condenser. The temperature of the reaction mixture was lowered during the portionwise addition of 33.5 g. of anhydrous aluminum chloride according to the schedule below:

| Time, Min. | Temp., °C. | Added AlCl₃ | Total AlCl₃ |
|---|---|---|---|
| 0 | 105 | 2 | 2 |
| 14 | 98 | 4 | 6 |
| 37 | 87 | 4 | 10 |
| 67 | 80 | 9 | 19 |
| 92 | 86 | 11 | 30 |
| 157 | 78 | 3.5 | 33.5 |

The reaction mixture was heated briefly to 110° and was allowed to cool overnight to 26°. The liquid product was extracted with 20% potassium hydroxide solution, dilute sulfuric acid and was washed with water. It was dried over magnesium sulfate, filtered and distilled at atmospheric pressure. In this way the following fractions were obtained: bromobenzene, 31 g., B.P. 150–160°; intermediate cut 7:6 g., B.P. 160–218°; dibromobenzenes, 554 g., B.P. 218–225°; bottoms 133 g.

The slushy dibromobenzenes mixture was cooled to −12° and filtered to yield 308 g. (38.5%) of liquid, 83% meta-, 6% ortho- and 11% para-isomers.

*Example IV.—Bromination of Bromobenzene With Aluminum Chloride Catalyst*

A mixture of 463 g. (2.9 moles) of bromobenzene and 5 g. of aluminum chloride was treated with 473 g. (2.9 moles) of bromine during stirring according to the following table:

| Time | Temp. | Bromine Added (ml.) |
|---|---|---|
| 0 | 65 | 0 |
| 30 | 81 | 16 |
| 60 | 83 | 33 |
| 90 | 83 | 48 |
| 125 | 84.5 | 78 |
| 150 | 85 | 98 |
| 180 | 88 | 118 |
| 210 | 90 | 145 |
| 215 | 93 | 158 |

The reaction mixture was allowed to cool overnight to 27°. It was cooled to about 15° for four hours, extracted with potassium hydroxide solution, washed with water, dried over magnesium sulfate, filtered and distilled. The following fractions were collected: bromobenzene and intermediate cut, B.P. 149–217°, 57.6 g.; dibromobenzenes, B.P. 217–223°, 496 g. (72.5%), 61% meta-, 2% ortho- and 37% para-isomer. The mixture was cooled to −15° and filtered to yield 242 g. (35.3%), 85% meta-, 4% ortho- and 11% para-isomer.

*Example V.—Bromination of Bromobenzene in the Presence of Aluminum Bromide Catalyst*

A mixture of 471 g. (3.0 moles) of bromobenzene and 15 g. of aluminum bromide was stirred during heating to 116°. The mixture was then cooled to about 55° and 480 g. (3.0 moles) of bromine was added during stirring at that temperature over a period of three hours. Another 10 g. of aluminum bromide was added and the mixture was allowed to cool overnight to 27°. The mixture was washed with 40% potassium hydroxide solution and distilled. The dibromobenzene fraction, B.P. 217–222°, 64% meta-, 3% ortho- and 32% para-isomer, weighed 489 g. (69% yield). It was cooled to −11° and filtered to give 203 g. (29%) of liquid, 86% meta-, 6% ortho- and 8% para-isomer. Application of vacuum to the filter cake gave 153 g. (22%) more product, 81% meta-, 5% ortho- and 14% para-isomer. The combined yield of dibromobenzene was 51%.

I claim as my invention:

1. The process for preparing a mixture of dibromobenzenes rich in the meta isomer comprising reacting together under anhydrous conditions bromine and benzene in the proportions of two moles of bromine per mole of benzene at a temperature from about 40° to about 120° C., while continuously adding to the reaction mixture a catalytic amount of aluminum trihalide catalyst, said halide having an atomic weight greater than 19.

2. The process for preparing a mixture of dibromobenzenes rich in the meta isomer comprising reacting together under anhydrous conditions bromine and benzene in the proportions of about two moles of bromine per mole of benzene at a temperature from about 75° C. to about 120° C., while continuously adding to the reaction mixture a catalytic amount of aluminum tribromide.

3. The process of claim 1, wherein the aluminum trihalide catalyst is aluminum trichloride.

4. The process for preparing a mixture of dibromobenzenes rich in the meta isomer comprising reacting together under anhydrous conditions substantially equimolar amounts of bromine and benzene at a temperature from about 25° C. to about 120° C. to yield monobromobenzene; and reacting together substantially equimolar amounts of said monobromobenzene and bromine at a temperature from about 75° C. to about 120° C., while continuously adding to the reaction mixture a catalytic amount of aluminum tribromide.

5. In the process for preparing a mixture of dibromobenzenes rich in the meta isomer by reacting together under anhydrous conditions bromine and benzene, in the proportion of about two moles of bromine per mole of benzene, in the presence of a catalytic amount of aluminum trihalide catalyst, said halide having an atomic weight greater than 19, at a temperature between 75° C. and about 120° C., the improvement which comprises continuously adding the catalyst to the reaction at a rate substantially proportional to the rate of bromine being added.

6. In the process for preparing a mixture of dibromobenzenes rich in the meta isomer by brominating benzene with bromine in the presence of a catalytic amount of aluminum trihalide, said halide having an atomic weight greater than 19, the improvement which comprises reacting together under anhydrous conditions substantially equimolar amounts of bromine and monobromobenzene at a temperature between about 75° C. and about 120° C., while continuously adding to the reaction mixture said aluminum trihalide.

References Cited in the file of this patent

UNITED STATES PATENTS

| | | |
|---|---|---|
| 2,527,606 | Webb | Oct. 31, 1950 |
| 2,659,760 | Frevel et al. | Nov. 17, 1953 |
| 2,666,085 | Fitzpatrick | Jan. 12, 1954 |
| 2,884,470 | Harrison et al. | Apr. 28, 1959 |

OTHER REFERENCES

Leroy: "Bull. Soc. Chim. de France" (2), vol. 48, 1887, pp. 210–6.

Van der Linden: "Recueil des Travaux Chimiques," vol. 30 (1911), pp. 305–380, pp. 364–76 only needed.

Holleman: "Chemical Reviews," vol. 1 (1924), pp. 187–230, pp. 221–9 only needed.

Wibaut et al.: Ibid., vol. 52 (1933), pp. 794–807.